United States Patent Office 3,429,224
Patented Feb. 25, 1969

3,429,224
TEMPERATURE COMPENSATED SPINDLE POSITIONER
John G. Osburn, Milwaukee, Wis., assignor to Kearney & Trecker Corporation, West Allis, Wis., a corporation of Wisconsin
Filed June 14, 1966, Ser. No. 562,999
U.S. Cl. 90—11                                15 Claims
Int. Cl. B23c 9/00; B23q 5/54; F16c 35/04

ABSTRACT OF THE DISCLOSURE

The disclosure relates to the mounting and drive for a spindle, wherein the mounting is particularly constructed to compensate for an expansion of the spindle due to any rise in temperature.

---

This invention is directed to a temperature compensating spindle positioner, and more particularly to a device adapted to continuously maintain the tool receiving end of a machine tool spindle in a preselected axial position irrespective of variations in operating temperature.

A principal object of the present invention is to provide a positioner for maintaining the tool receiving end of a machine tool spindle in a preselected axially adjusted position.

Another object of the invention is to provide a thermally responsive spindle positioner.

Another object of the invention is to provide a thermally responsive spindle bearing positioner adapted to compensate for axial spindle expansion.

Another object of the invention is to compensate for axial spindle expansion irrespective of temperature variations during operation.

Another object is to provide a bimetallic spindle compensator.

According to this invention, a machine tool is provided with a spindle head having a spindle reference member for determining the preselected axial position of the tool receiving end of a tool spindle. A rearwardly expansible bearing carrier secured at its forward end to the front face of the reference member, extends rearwardly to fixedly support the outer races of a pair of spindle bearings. A tool spindle having its tool receiving end in predetermined forwardly spaced relationship to the reference member is supported toward its forward end by the inner races of the bearings in the carrier. Upon an increase in temperature, axial forward expansion of the spindle is accompanied by a corresponding rearward expansion of the bearing carrier. Thus, rearward bearing movement compensates for axial forward spindle expansion.

The foregoing and other objects of the invention which will become more fully apparent from the following detailed description, may be achieved by means of the particular structure constituting an exemplifying embodiment of the invention that is shown in and described in connection with the following drawings in which.

Figure 1:
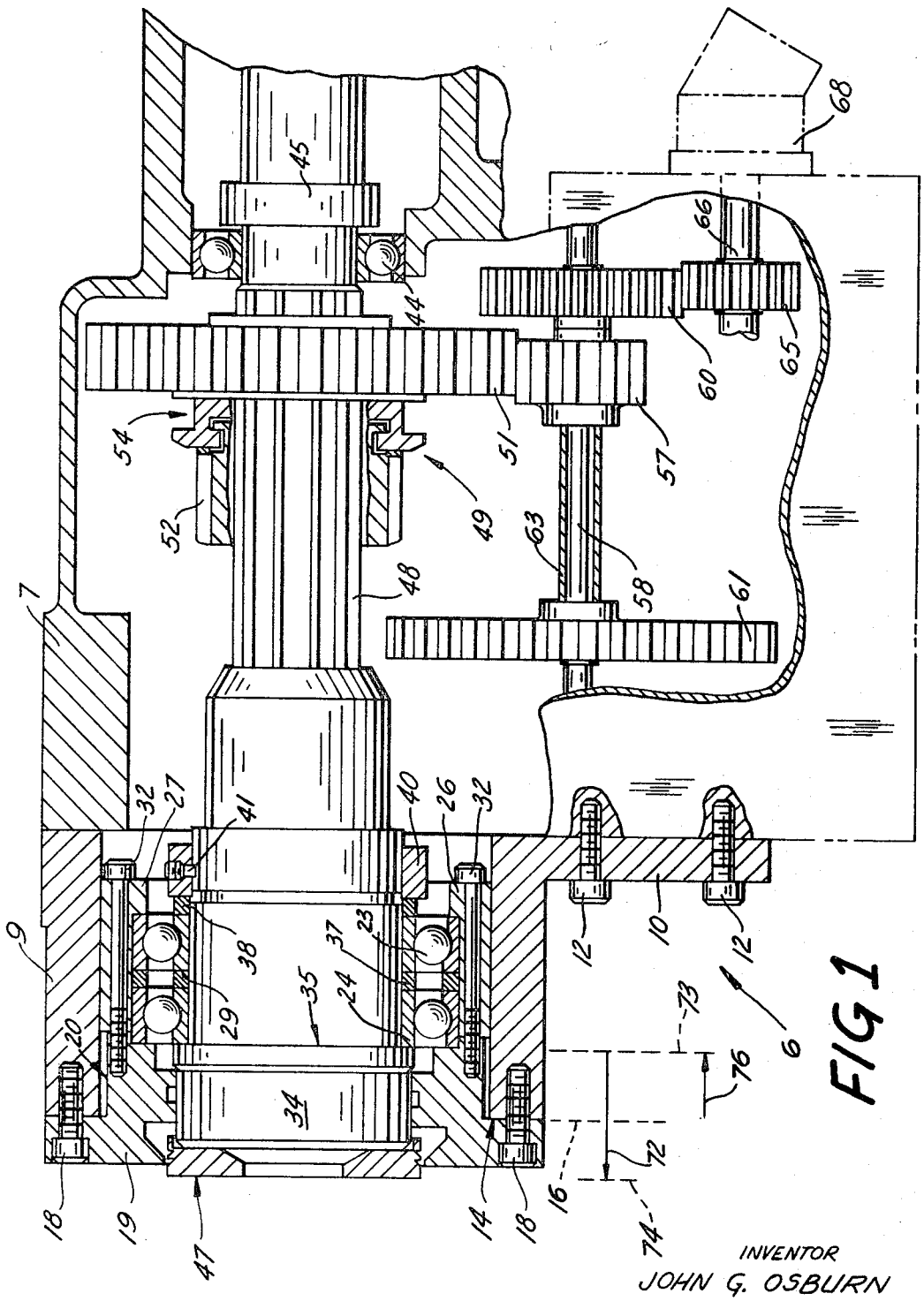
FIGURE 1 is an enlarged fragmentary view in vertical, logitudinal section through a tool spindle head for a machine tool embodying the features of this invention.
Figure 2:
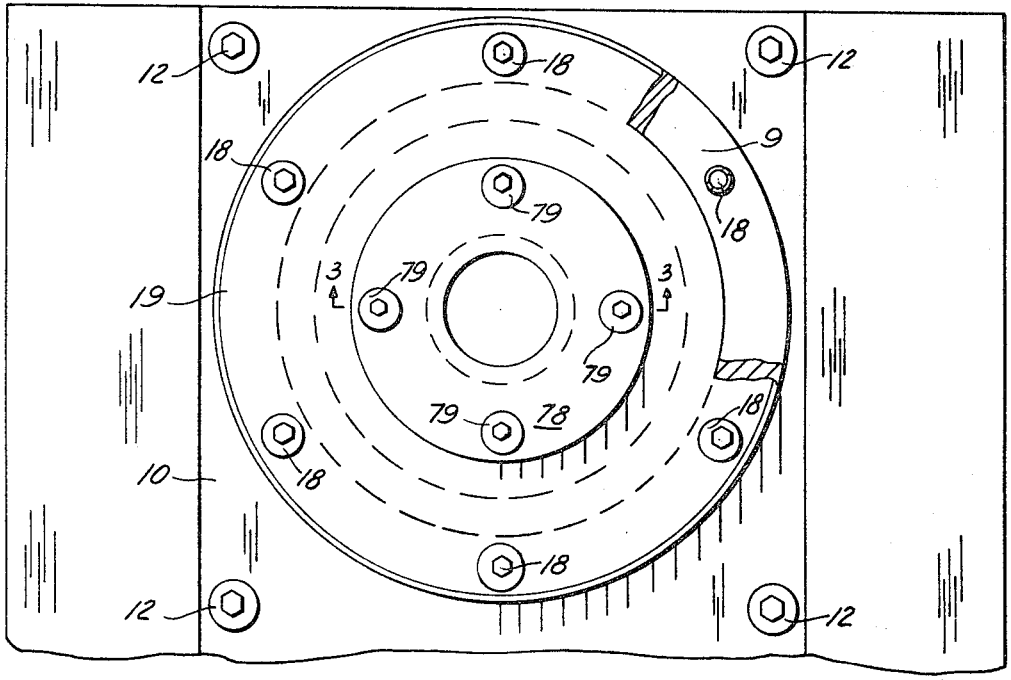
FIG. 2 is a fragmentary view in front elevation of the machine tool spindle head shown in FIG. 1.

Referring more particularly to the drawings, the portion of a machine tool thereshown comprises a spindle carrying head 6 having a supporting frame 7. A forwardly extending, tubular spindle carrier 9 is provided with an integrally formed rectangular support plate 10 fixedly secured to the front face of the frame 7 by means of cap screws 12, as shown in FIGS. 1 and 2. The tubular spindle carrier 9 is provided with a front face 14 that constitutes a spindle reference surface, this face 14 being indicated by a transverse dotted line 16. Preferably, the spindle carrier 9 is made of a metal having a relatively low coefficient of expansion. For example, the carrier 9 can be made of one of the nickel alloys known commercially as Invar.

To the tubular forward face 14 of the spindle carrier 9 there is secured by peripherally spaced cap screws 18 the flanged portion of a spindle bearing mount 19 that is preferably made of a metal having a relatively high coefficient of expansion, such as aluminum. Because of the relatively high coefficient of expansion of the bearing mount 19, peripheral clearance 20 is provided between the axially inward portion thereof and the inner diameter of the carrier 9. A pair of spindle bearings 23 and 24 are retained in spindle supporting position by a flanged bearing retainer 26 that is secured to the inner face of the bearing mount 19, as shown in FIG. 1. For securing the bearings 23 and 24 in position. the inner face of a flange 27 integrally formed with the retainer 26 directly engages the outer race of the bearing 23. The outer race of bearing 23 engages an annular spacer 29 that engages the outer race of bearing 24 to maintain the opposite face thereof in direct abutting engagement with the rearward or inner face of the bearing mount 19. The bearing retainer 26 is secured to the bearing mount 19 by a plurality of peripherally spaced cap screws 32.

A tool spindle 34 is rotatably supported by the bearings 23 and 24, as shown in FIG. 1, and is maintained thereby in predetermined, axially adjusted position irrespective of variations in temperature during operation. The inner race of the bearing 24 is maintained in abutting engagement with a flanged shoulder 35 presented toward the forward end of the spindle 34. A first inner, annular spacer 37 is engaged between the inner race of bearing 24 and the inner race of bearing 23, the latter being maintained in position by a second annular spacer 38 adjustably secured in position by an annular lock nut 40 threadedly engaging the spindle 34, and secured thereto by a lock screw 41. Toward its central rearward position, the spindle 34 is rotatably supported by a bearing 44 having its outer race carried for limited axial sliding movement. An annular lock nut 45 is threadedly secured to the spindle 34 rearwardly of the bearing 44. With this arrangement, it will be apparent that the spindle 34 is free to expand or contract in an axially rearward direction upon variations in temperature during operation. Likewise, the front tool receiving end 47 of the spindle 34 is maintained in predetermined, axially selected position by the front bearings 23 and 24, as will hereinafter be more fully explained.

For rotating the tool spindle 34 at a selected operating speed, the central portion thereof is provided with longitudinal splines 48 engaged by an internally splined, shiftable gear couplet 49. The gear couplet 49 comprises a low speed gear 51 and a high speed pinion 52. An annular groove 54 provided in the couplet 49 is engaged by a shifter fork (not shown) for effecting shifting movement, and for retaining the couplet in a selected shiftably adjusted position.

As shown in FIG. 1, the low speed gear 51 is meshingly engaged by a drive gear 57 keyed to a shaft 58 journaled to rotate in spaced apart bearings (not shown) carried within the spindle head 6. Gears 60 and 61 are likewise keyed to the rotatable shaft 58; the gears 57 and 61 on the shaft being separated by a tubular spacer 63.

For rotating the shaft 58, the gear 60 is meshingly engaged by a gear 65 secured to a shaft 66 selectively rotated by a variable speed spindle drive motor 68. To rotate the spindle 34 in the high speed range, the couplet 49 is shiftably moved to disengage the low speed gear 51 and move the high speed gear 52 into driven engagement with the drive gear 61. The tool spindle 34 is operable to be driven at an extremely wide range of output speeds, depending on the selected input driving speed of the drive motor 68. In a preferred embodiment, for example, the spindle 34 is connectable to be rotatably driven at speeds ranging from 100 r.p.m. to a maximum of approximately 3000 r.p.m.

Variations in temperature of the spindle result from the selected output speed, the load, and the environmental temperature in which the machine is being operated. A sufficient increase in temperature causes the spindle 34 to expand axially and shift a tool carried thereby a sufficient distance to cause a corresponding inaccuracy in a machining operation. With an extreme rise in temperature, such an axial shift of a tool due to spindle expansion can exceed four thousandths (.004) of an inch. In the present invention, such an axial shift is compensated for in a manner that the tool receiving end 47 of the spindle 34 is maintained in its predetermined position.

As shown in FIG. 1, that portion of the spindle 34 extending forwardly from the shoulder 35 engaging the front bearing 24 to the tool receiving end 47 of the spindle is adapted to expand in an axial forward direction upon an increase in temperature. This portion of the spindle 34 and the forward direction of axial expansion are illustrated by the directional arrow indicated at 72, extending between the dotted lines 73 and 74. The compensating rearward axial expansion of the bearing mount 19 is indicated by the directional arrow 76 extending between the dotted lines 16 and 73. Due to the difference in coefficient of expansion between the tool spindle 34 and the bearing mount 19, the extent of rearward expansion of the bearing mount 19 is approximately equal to the extent of forward axial expansion of the spindle. Consequently, the front or tool receiving end 47 of the spindle is maintained substantially in its predetermined, axially selected position.

For illustrative purposes, it will now be assumed the normal, forwardly expansible portion of the spindle indicated at 72 is 2.25 inches and the expansion coefficient thereof is $(6.5 \times 10^{-6})$. The corresponding, rearwardly expansible portion of the bearing mount 19 indicated at 76 is 1.25 inches. Being made of a high coefficient of material, such as aluminum, the coefficient of expansion of the bearing mount 19 is approximately $(13 \times 10^{-6})$. With these conditions existing, assume a 70° F. temperature rise:

Spindle expansion—
$$(2.25)(70)(6.5)(10^{-6}) = +0.00102$$
Compensating brg. mt. exp.—
$$(1.25)(70)(13)(10^{-6}) = -0.00114$$
$$\overline{-0.00012}$$

Although the foregoing example appears to illustrate a net overcompensation in a negative direction, such an apparent overcompensation is required to actually result in a net zero axial movement due to an inherent differential in temperature throughout the entire structure. It will be apparent that the compensating effect produced by the bearing mount can be varied by predeterminately varying the proportionate lengths of the relative portions of the spindle 34 and the bearing mount 19 as indicated at 72 and 76 respectively. In addition to marking the spindle shoulder 35, the transverse dotted line 73 is also aligned with the inner end of the bearing mount 19 that engages the outer race of the spindle bearing 24. As hereinbefore explained, the dotted line 16 is aligned with the tubular reference surface 14 of the spindle carrier 9.

Inasmuch as the bearing retainer 26 is secured to the inner end of the mount 19 to maintain the outer races of bearings 23 and 24 in position, this entire assembly is moved rearwardly upon axial expansion of the bearing mount 19. In effect, the bearing mount 19 and retainer 26 constitute an axially movable bearing support for the outer races of the spindle bearings 23 and 24. Axial rearward movement of bearings 23 and 24 effects a corresponding axial positioning movement of the forward end of the spindle which is secured to the inner races of the bearings.

Figure 3:
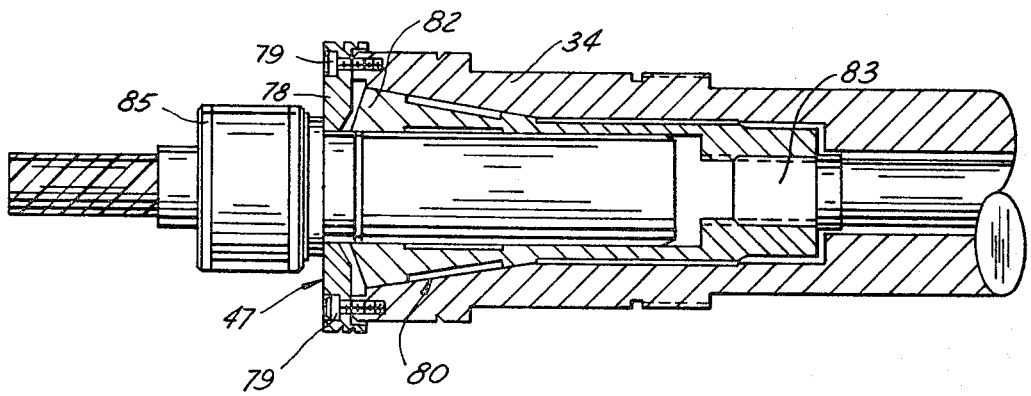
FIG. 3 is a view in vertical, transverse section through the spindle head and taken generally along the line 3—3 in FIG. 2.

As shown in FIGS. 2 and 3, the tool receiving end 47 of the spindle 34 comprises an annular slinger 78 secured to the front end of the spindle by cap screws 79. Toward its forward end, the spindle 34 is provided with an axial taper 80, engaged by the complementary jaws of an axially movable collet 82. Toward its inner end, the collet 82 is secured to a rod 83 extending rearwardly through the spindle 34. By means of resilient means (not shown), the rod 83 is urged rearwardly to urge the jaws of the collet 82 radially inward to tool clamping position. As shown in FIG. 3, the collet 82 is in clamped engagement with a tool holder 85, and with a shoulder presented by the tool holder being maintained in abutting engagement with the tool receiving spindle end 47. For effecting a tool change, the clamp rod 83 is urged forwardly, permitting the collet 82 to expand radially for releasing the tool holder 85. With the collet 82 retained in disengaged position, the tool holder 85 can be axially withdrawn from the spindle 34 and replaced with a different tool holder carrying a different preselected tool. Such a tool interchange can be effected manually or mechanically after which the rod 83 is moved rearwardly to urge the collet to clamped position for engaging the interchanged tool holder.

Although the illustrative embodiment of the invention has been described in considerable detail for the purpose of setting forth an operative and practical operating structure, it is to be understood that the structure shown and described is intended to be illustrative only and that various characteristics of the invention may be incorporated in other structural forms without departing from the spirit and scope of the invention as defined in the subjoined claims.

The principles of this invention having now been fully explained in connection with the foregoing description, I hereby claim as my invention:

1. In a machine tool:
   a spindle head having a reference member;
   a rotatable tool spindle axially expansible in a forward direction relative to said reference member upon an increase in temperature;
   a bearing carried by said spindle in a fixedly spaced axial position therealong; and
   a bearing mount carried by said reference member and being operative upon an increase in temperature to effect rearward axial positioning movement of said bearing relative to said reference member to compensate for the axial forward expansion of said spindle relative thereto.

2. In a machine tool according to claim 1 characterized by said bearing mount having a coefficient of expansion approximately twice as great as the coefficient of expansion of said spindle.

3. In a machine tool according to claim 1 characterized by said spindle being made of steel and said bearing mount being made of aluminum.

4. In a machine tool according to claim 1 characterized by said reference member being of hollow tubular configuration extending in an axial forward direction relative to said spindle head and being disposed to present a front face constituting a reference surface, and means for securing the forward end of said bearing mount to said reference surface.

5. In a machine tool according to claim 1 characterized by said reference member being made of Invar.

6. In a machine tool spindle head having a supporting frame:
   a hollow tubular reference member extending forwardly from said spindle head and opening therein, said tubular reference member presenting at its forward end a tubular reference surface;
a tubular bearing mount secured at its forward outer end to said reference surface and extending axially rearward within said tubular reference member;
a spindle supporting bearing having its outer race secured to the inner end of said bearing mount for axial rearward positioning movement therewith upon an increase of temperature; and
a tool spindle having a forwardly extending tool receiving end and being fixedly constrained against axial movement relative to the inner race of said spindle bearing, said tool spindle being adapted to expand in an axial forward direction upon an increase in temperature and in proportion to the rearward positioning movement of said spindle bearing due to the concomitant axial rearward expansion of said bearing mount;
whereby the tool receiving end of said spindle is retained in predetermined position relative to said reference member irrespective of changes in temperature.

7. In a machine tool according to claim 6 characterized by said spindle being made of steel and said bearing mount being made of aluminum.

8. In a machine tool according to claim 6 characterized by said reference member being made of Invar.

9. In a machine tool according to claim 6 characterized by a rearwardly spaced bearing carried within said spindle head for limited actual movement and being positioned to rotatably support a central rearwardly spaced portion of said spindle for rotatable movement.

10. In a machine tool according to claim 6 characterized by a variable speed power driven transmission operable to drive said spindle at a selected one of a wide range of operating speeds.

11. In a machine tool having a frame:
a tubular reference member secured toward the forward end of said frame;
a tubular bearing mount secured at its forward end to said reference member and extended rearwardly therethrough, said bearing mount being of a higher coefficient of expansion than said reference member and being adapted to expand in an axially rearward direction relative thereto whenever the temperature thereof is increased;
a bearing having its outer race fixedly carried by the inner end of said mount for axial movement therewith;
a tool spindle rotatably carried by the inner race of said bearing at a point spaced rearwardly from the tool receiving end thereof a distance exceeding the width of said bearing, said tool spindle being adapted to expand in an axially forward direction relative to said bearing a distance proportional to the axial rearwardly expansion of said bearing mount; and
a variable speed transmission connected to drive the tool spindle at a selected rate.

12. In a temperature compensated spindle positioning device for a machine tool:
a spindle head presenting a reference member;
a rearwardly extending bearing mount secured at its forward outer end to said reference member, said bearing mount being adapted to expand in a rearward axial direction upon an increase in temperature;
a spindle bearing having its outer race secured to the inner end of said bearing mount for axial positioning movement therewith;
a tool spindle having a tool receiving end and being constrained against axial movement relative to the inner race of said spindle bearing for predetermined axial positioning movement therewith upon rearward axial movement of said bearing mount.

13. In a machine tool according to claim 12 characterized by rearward positioning movement of said spindle bearing being adapted to compensate for axial forward expansion of said spindle relative to said spindle bearing.

14. In a machine tool according to claim 12 characterized by said bearing mount being made of aluminum.

15. In a machine tool:
a reference member;
a machine tool element expansible in one direction relative to said reference member upon an increase in temperature;
a bearing carried by said machine tool element in fixedly spaced position along said one direction; and
a bearing mount carried by said reference member and being expansible in the direction opposite said one direction upon an increase in temperature to effect positioning movement in said opposite direction of said bearing mount relative to said reference member to compensate for the expansion of said machine tool element in said one direction.

References Cited

UNITED STATES PATENTS

| | | | |
|---|---|---|---|
| 2,111,869 | 3/1938 | Montgomery | 82—30 |
| 2,271,637 | 2/1942 | Garrison et al. | 82—900 |
| 2,352,206 | 6/1944 | Kendall | 82—900 |
| 2,358,088 | 9/1944 | Lange et al. | 82—900 |
| 3,221,605 | 12/1965 | Hemmerle | 90—11 |
| 3,329,066 | 7/1967 | Wood | 90—11 |

GERALD A. DOST, *Primary Examiner.*

U.S. Cl. X.R.

82—30; 308—178, 189